United States Patent
Boehm et al.

(10) Patent No.: US 9,592,749 B2
(45) Date of Patent: Mar. 14, 2017

(54) VEHICLE SEAT, IN PARTICULAR MOTOR VEHICLE SEAT

(75) Inventors: André Boehm, Kaiserslautern (DE);
Georg Fischer, Winnweiler (DE);
Ralph Recktenwald, Freisen (DE)

(73) Assignee: KEIPER GMBH & CO. KG,
Kaiserslautern (DE)

(*) Notice: Subject to any disclaimer, the term of this patent is extended or adjusted under 35 U.S.C. 154(b) by 201 days.

(21) Appl. No.: 14/131,567

(22) PCT Filed: Jul. 19, 2012

(86) PCT No.: PCT/EP2012/003054
§ 371 (c)(1),
(2), (4) Date: Jan. 8, 2014

(87) PCT Pub. No.: WO2013/029720
PCT Pub. Date: Mar. 7, 2013

(65) Prior Publication Data
US 2014/0152065 A1   Jun. 5, 2014

(30) Foreign Application Priority Data

Aug. 29, 2011   (DE) .................. 10 2011 113 789

(51) Int. Cl.
*B60N 2/04* (2006.01)
*B60N 2/22* (2006.01)
(Continued)

(52) U.S. Cl.
CPC ............ *B60N 2/04* (2013.01); *B60N 2/22* (2013.01); *B60N 2/309* (2013.01); *B60N 2/3031* (2013.01); *B60N 2/3065* (2013.01); *B60N 2/206* (2013.01)

(58) Field of Classification Search
None
See application file for complete search history.

(56) References Cited

U.S. PATENT DOCUMENTS 7,172,252 B2 *  2/2007  Henning .............. B60N 2/3031
                                                          297/353
7,644,982 B2 *  1/2010  Paluch .................. B60N 2/203
                                                          297/101
(Continued)

FOREIGN PATENT DOCUMENTS

DE              203 02 007 U1     4/2003
DE       10 2008 012 714 B3     10/2009
(Continued)

OTHER PUBLICATIONS

International Search Report mailed Oct. 16, 2012, as received in corresponding International Application No. PCT/EP2012/003054.
International Preliminary Report on Patentability and Written Opinion received in PCT/EP2012/003054 dated Mar. 4, 2014.

*Primary Examiner* — David E Allred
(74) *Attorney, Agent, or Firm* — Foley & Lardner LLP

(57) ABSTRACT

A vehicle seat has a basic structure, a backrest support which is articulated on the basic structure in a lockable manner by at least one fitting, a backrest structure a backrest that has the backrest support and the backrest structure, the backrest being movable in relation to the basic structure by a kinematic system in order to transfer the vehicle seat from at least one use position, in which it can be sat on, into an out-of-use position or into a further use position and back again. A four-bar linkage temporarily exists the four-bar linkage controlling the kinematic system.

17 Claims, 6 Drawing Sheets

Figure 1:
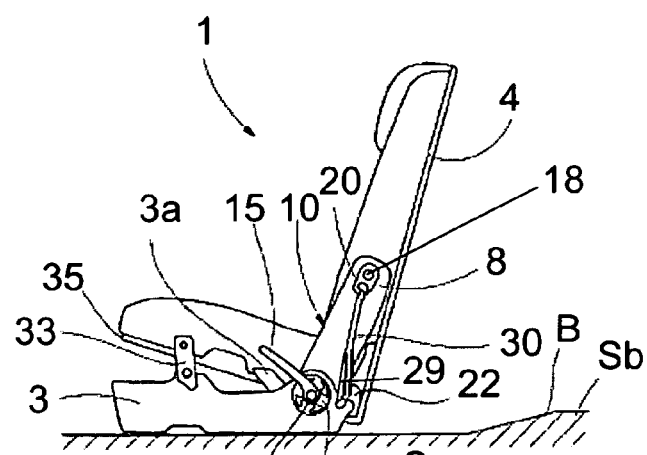

(51) Int. Cl.
*B60N 2/30* (2006.01)
*B60N 2/20* (2006.01)

(56) References Cited

U.S. PATENT DOCUMENTS

| | | | | |
|---|---|---|---|---|
| 2003/0056329 | A1* | 3/2003 | Coman | B60N 2/206 16/343 |
| 2006/0152030 | A1* | 7/2006 | Van Dyk | B60N 2/3031 296/65.09 |
| 2007/0138847 | A1* | 6/2007 | Gundall | B60N 2/206 297/216.1 |
| 2008/0143163 | A1* | 6/2008 | Harth | B60N 2/3031 297/378.12 |
| 2010/0026033 | A1* | 2/2010 | Homier | B60N 2/3013 296/65.08 |
| 2011/0316317 | A1* | 12/2011 | Sprenger | B60N 2/206 297/344.1 |
| 2013/0062903 | A1* | 3/2013 | Mather | B60N 2/2356 296/64 |
| 2013/0207411 | A1* | 8/2013 | Holzhueter | B60N 2/36 296/65.09 |
| 2014/0312670 | A1* | 10/2014 | Bohm | B60N 2/22 297/354.1 |

FOREIGN PATENT DOCUMENTS

| | | |
|---|---|---|
| DE | 20 2009 016 989 U1 | 4/2010 |
| WO | WO-2007/006440 A2 | 1/2007 |

* cited by examiner

VEHICLE SEAT, IN PARTICULAR MOTOR VEHICLE SEAT

CROSS REFERENCE TO RELATED APPLICATIONS

The present application is a U.S. National Stage of International Application No. PCT/EP2012/003054, filed on Jul. 19, 2012, which claims the benefit of German Patent Application No, 10 2011 113 789.4, filed on Aug. 29, 2011, the entire disclosures of all of which are incorporated herein by reference.

The invention relates to a vehicle seat, in particular a motor vehicle seat, having the features of the preamble of claim 1.

DE 10 2008 012 714 B3 has disclosed a vehicle seat of the type mentioned at the outset. On both vehicle seat sides, the backrest has a backrest support which is articulated in a lockable manner on the base structure by means of a fitting, and a backrest structure which is articulated on both vehicle seat sides on the associated backrest support by means of in each case one joint and can be locked to the backrest support by means of a locking apparatus. A spring unit, consisting of a gas spring and an end stop for the gas spring, is provided on one vehicle seat side. The spring unit is articulated on an arm of the backrest structure such that it is offset with respect to the fitting on the base structure and offset with respect to the joint.

The transition from the use position into the non-use position takes place by way of unlocking and pivoting of the backrest structure to the front and of the backrest support to the rear. The pivoting backrest structure defines a pivoting angle (relative to the backrest support). When the backrest structure reaches a certain pivoting angle region, the spring unit passes into its end stop, with the result that the articulation points of the spring unit which is situated in the end stop (and therefore forms a mechanism element), the joint and the fitting temporarily define a four-bar linkage which controls the kinematic system comprising backrest support and backrest structure as long as the backrest structure is situated in the certain pivoting angle region. In the end phase of the transition into the non-use position, the temporary four-bar linkage is canceled again, and the kinematic system functions as an, in particular, uncontrolled two-bar linkage.

The invention is based on the object of improving a vehicle seat of the type mentioned at the outset. According to the invention, this object is achieved by way of a vehicle seat having the features of claim 1. Advantageous refinements are the subject matter of the subclaims.

The kinematic system of the backrest is controlled by means of the temporarily existing multiple-bar linkage, in particular four-bar linkage. During this phase of the existence of the four-bar linkage, there is only one degree of freedom, that is to say a defined transition takes place, preferably into the non-use position. The use of a stop link as mechanism element of said multiple-bar linkage is less expensive than a gas pressure spring. The spring force is then preferably applied inexpensively by way of a leaf spring which is arranged next to the stop link (that is to say as an alternative with regard to the force flow) or by way of a rubber buffer which is arranged in the stop link. In its stretched position, a leaf spring could also alone become a mechanism element of said multiple-bar linkage, but the geometric conditions can be defined more accurately in the case of the stop link. The use of a multiple-bar linkage to control a kinematic system is not restricted to the transition into a non-use position. It is also conceivable to control another movement of the backrest in this way, for example an inclination setting, or a height setting or inclination setting of the seat cushion structure. The term "control" is to be interpreted broadly, with the result that the multiple-bar linkage can also comprise parts of the backrest or can support the latter.

The stop link acts between the base structure and the backrest structure, to be precise offset with respect to the backrest support. Accordingly, the stop and articulation elements (generally called pins in the present case) for the stop link are arranged offset with respect to the pivot axes of the backrest structure and the backrest supports, with the result that their spacing changes during the transition between use and non-use positions of the vehicle seat by means of the kinematic system of the backrest. The stop link is configured at one end for contact with one of the pins and at the other end for contact with the other of the pins. The stop link preferably has a slot, the ends of which, that is to say the bordering material parts, form the stop for interacting with one of the pins.

In its relieved stretched position, the leaf spring would act as a tensile link, that is to say would be subjected to a tensile load. Outside the stretched position, the leaf spring bends in a manner induced by its geometry. The leaf spring builds up a tension in its bent layers, on account of which tension it can act as a compression spring, for example in order to counteract the weight of the backrest, just like a backrest compensation spring which is preferably additionally present. A certain length of the leaf spring permits the building up of a sufficient tension even at low curvatures of the leaf spring, that is to say there is a low requirement for installation space.

In the non-use position, the backrest structure is preferably carried on a front support which is preferably formed on the base structure and on a rear support which is preferably formed on the vehicle structure. Apart from an improved introduction of force during the loading of the vehicle seat in the non-use position, it is possible in this way, during the return from the non-use position into the use position, that the backrest bottom edge slides along a guide track, adjacent to the rear support, on the vehicle structure, with the result that there is once again only one degree of freedom for the kinematic system.

The vehicle seat according to the invention is equivalent in terms of several design features to the vehicle seats which are described in DE 10 2008 012 714 B3 and in WO 2007/006440 A2 as second exemplary embodiment, for which reason their content of disclosure in this regard is expressly incorporated.

Thus, during the transition from the use position into the non-use position when the locked backrest structure pivots to the front and the backrest support which is unlocked in a positively controlled manner by the backrest structure pivots to the rear, a non-use position (floor position) which is lower than a table position can be reached, which position is suitable for loading in contrast to a lying position. A seat cushion structure preferably pivots by somewhat more than 180° to the front, the original underside of the seat cushion structure then adjoining the original rear side of the backrest structure which lies behind it more or less in a flush and flat manner in the non-use position.

Positively controlled unlocking of the fitting simplifies the actuation which is to be performed by the user, by said user, for example, having to unlock only the locking apparatus of the backrest structure, while the backrest structure performs the unlocking of the backrest support, that is to say acts on the fitting. The backrest structure preferably unlocks the fitting by means of an unlocking link which is preferably of rigid configuration. For a specific temporal movement sequence, the unlocking link can provide an idle travel, for example a slot/pin guide, by means of which the positively controlled unlocking can be delayed and can be set to a certain pivoting angle region of the backrest structure.

Precisely one backrest support is preferably provided on each vehicle seat side, for example in the form of a rocker, it being possible for the two backrest supports to be coupled by way of transverse connections. This stabilizes the backrest for normal use and for the event of a crash. The springs or mechanism connections which are provided for the transition between use position and non-use position need be present only on one vehicle seat side, preferably on different vehicle seat sides. The leaf spring which is provided to act on the movement of the backrest structure can thus contribute to the compensation for the backrest weight during an inclination setting operation.

The leaf spring is also suitable for vehicle seats with a different kinematic system than that described.

Figure 2:
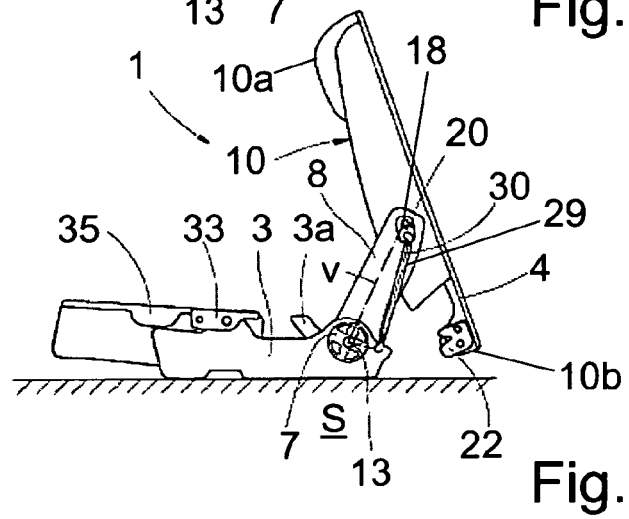
Figure 3:
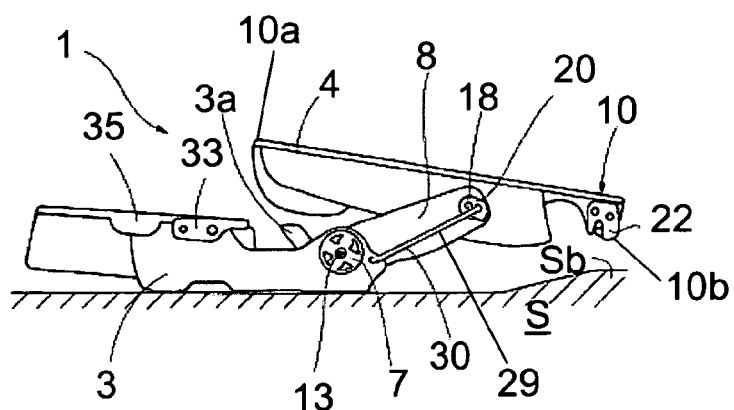
Figure 4:
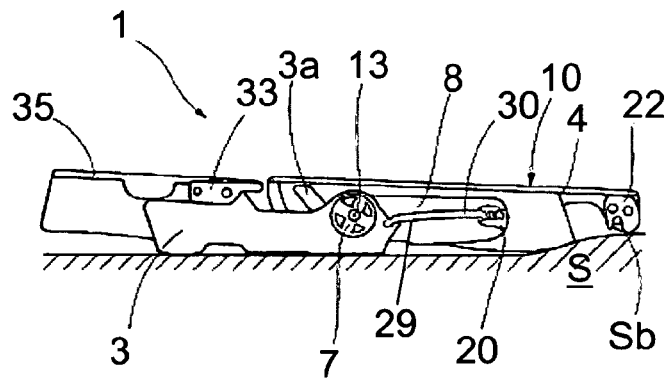
Figure 5:
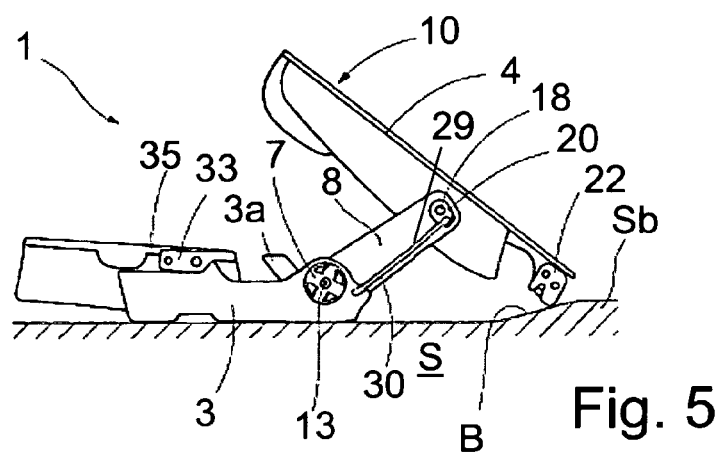
Figure 6:
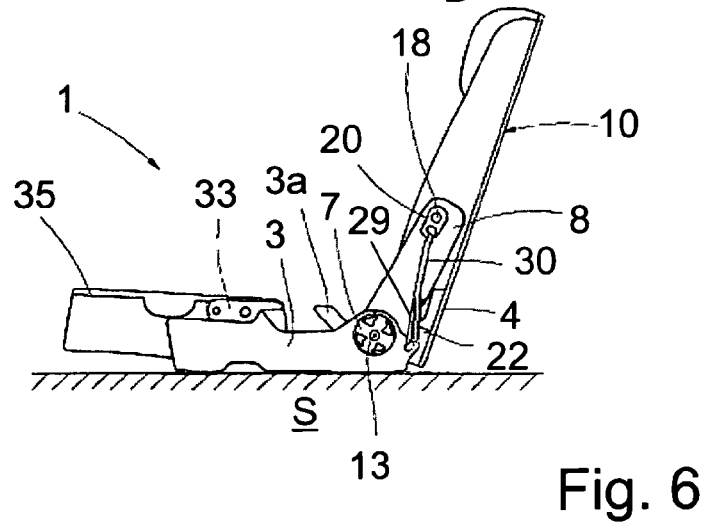
Figure 7:
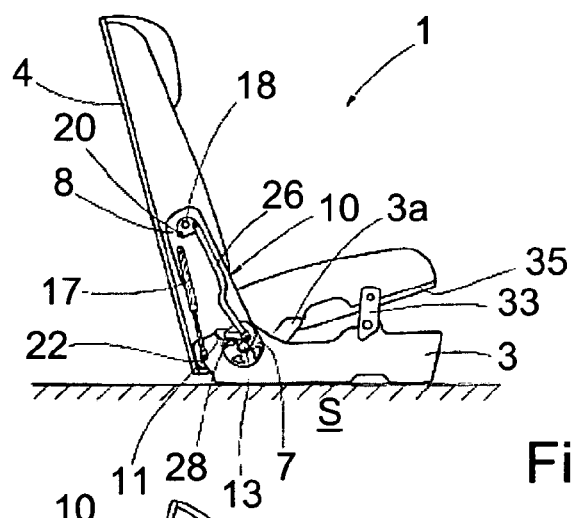
Figure 8:
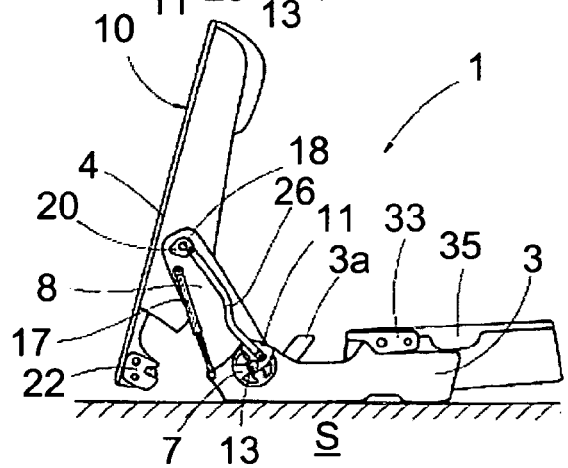
Figure 9:
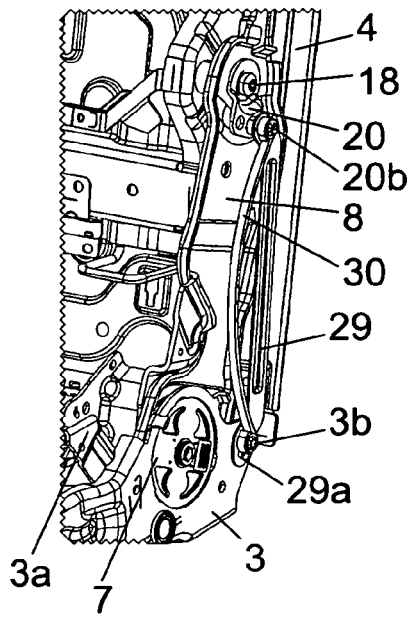
Figure 10:
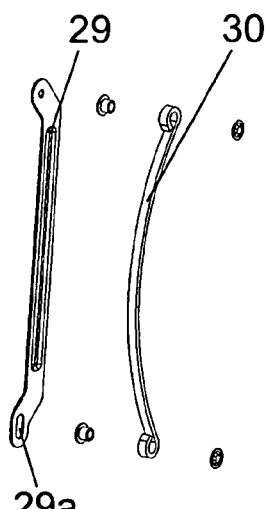
Figure 11:
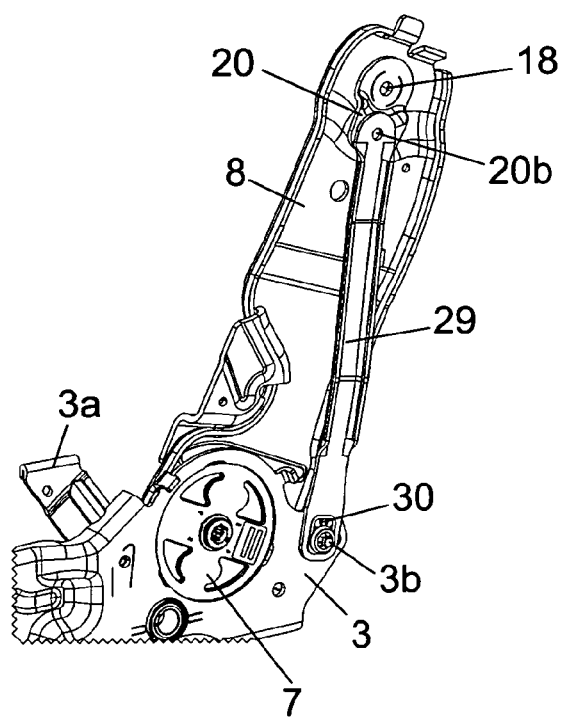

In the following text, the invention is explained in greater detail using one exemplary embodiment which is shown in the drawing with one modification. In the drawing:

FIG. 1 shows a left-hand side view of the exemplary embodiment in the use position, FIG. 2 shows a side view, corresponding to FIG. 1, in a first intermediate position during the transition into the non-use position, during the existence of the temporary four-bar linkage, FIG. 3 shows a side view, corresponding to FIG. 1, in an intermediate position during the transition into the non-use position, after canceling of the temporary four-bar linkage, FIG. 4 shows a side view, corresponding to FIG. 1, in the non-use position, FIG. 5 shows a side view, corresponding to FIG. 4, in a first intermediate position, during the return into the use position, FIG. 6 shows a side view, corresponding to FIG. 4, in a second intermediate position, during the return into the use position, FIG. 7 shows a right-hand side view of the exemplary embodiment, in the use position, FIG. 8 shows a side view, corresponding to FIG. 7, in an intermediate position during the transition into the non-use position, during the existence of the temporary four-bar linkage, FIG. 9 shows a perspective detailed view of the exemplary embodiment in the use position in the region of the stop link, FIG. 10 shows an exploded illustration of the stop link and a spring unit which is configured as a leaf spring, and FIG. 11 shows a perspective detailed view of a modification with a spring unit which is configured as a rubber buffer.

In the exemplary embodiment, a vehicle seat 1 is provided for a rear, in particular third, seat row of a motor vehicle, the arrangement of the vehicle seat 1 within the motor vehicle and its usual driving direction defining the directional indications used in the following text. As parts of its load-bearing structure, the vehicle seat 1 has a base structure 3 and a backrest structure 4 which is upholstered in a manner known per se. In the present case, the base structure 3 is connected fixedly to the vehicle structure S of the motor vehicle, but could also be adjustable longitudinally relative to the vehicle structure S by means of seat rails. Furthermore, the base structure 3 can be of articulated configuration per se. On both vehicle seat sides, in each case one fitting 7 is provided on the base structure 3, by means of which fitting 7 in each case one backrest support 8 which is configured as a rocker is attached such that it can be pivoted and locked relative to the base structure 3. Together with the upholstered backrest structure 4, the two backrest supports 8 define the backrest 10 of the vehicle seat 1. First of all, a use position of the vehicle seat 1, in which it can be sat on, is described.

In the present case, the fitting 7 is configured as a latching fitting, as is described, for example, in DE 20 2009 016 989 U1, the disclosure content of which in this regard is expressly incorporated. Here, one of the two fitting parts is connected fixedly to the base structure 3 at its rear end and the other fitting part is connected fixedly to the backrest support 8 at its lower end. It is also possible, however, to use a mechanism fitting with a free-pivoting function as fitting 7, as is described, for example, in DE 100 48 127 A1, the disclosure content of which in this regard is likewise expressly incorporated.

The fitting 7 which is normally locked can be unlocked by means of a first actuating element 11, by the first actuating element 11 which is configured in the present case as a slotted guide plate rotating a shaft 13. In each case one shaft 13 can be provided for each fitting or a common shaft 13 can be provided for both fittings 7, which shaft 13 couples the two fittings 7 and permits synchronous unlocking by means of a single first actuating element 11. In the present case, the first actuating element 11 is arranged on the vehicle seat side which is situated close to the vehicle interior, called the inner side of the vehicle seat 1 for short. The shaft 13 is aligned with the rotational axis of the fitting 7, that is to say the pivot axis of the backrest supports 8 relative to the base structure 3.

For an inclination setting of the backrest 10, the fitting 7 (as latching fitting in the configuration) can be unlocked by means of a second actuating element 15 which is configured in the present case as a lever handle. The second actuating element 15 can be connected fixedly to the first actuating element 11 so as to rotate with it, but in the present case acts directly on the shaft 13, it being possible for driving or decoupling in one rotational direction to be provided. In the present case, the second actuating element 15 is arranged on the vehicle seat side which is situated close to the vehicle exterior, called the outer side of the vehicle seat 1 for short. In a modified embodiment, no separate second actuating element 15 is provided, but rather, for the inclination setting of the backrest 10, the fitting 7 is actuated, for example, by means of the first actuating element 11.

A backrest compensation spring 17 which is configured in the present case as a gas spring and is arranged, for example, on the inner side of the vehicle seat 1 acts between the base structure 3 and the backrest support 8. If the fittings 7 are unlocked, the backrest compensation spring 17 compensates for at least part of the weight of the overall backrest. The backrest compensation spring 17 therefore acts in the forward pivoting direction of the backrest.

The backrest structure 4 is articulated on the backrest support 8 on both vehicle seat sides by means of a joint 18 which is configured as a pivot bearing. The joint 18 is provided between the upper end of the backrest support 8 and the backrest structure 4 in its lower half. The rotational axes which are defined by the joint 18 are aligned with one another and define the pivot axis of the backrest structure 4 relative to the backrest supports 8. In the use position, the rear side of the backrest structure 4 points substantially to the rear, slightly obliquely with respect to the horizontal. The joints 18 are constructed in such a way that in each case one central joint pin is provided which is connected fixedly to the backrest structure 4 so as to rotate with it. In each case one arm 20 is attached on said joint pin, offset axially with respect to the associated backrest support 8 on its outer side. The two arms 20 are therefore connected fixedly to the backrest structure 4 so as to rotate with it.

In the region of the lower end of the backrest structure 4, a locking apparatus 22 is provided on at least one vehicle seat side, on both vehicle seat sides in the present case. In the present case, the locking apparatus 22 is configured as a lock, as described, for example, in DE 203 02 007 U1, the disclosure content of which in this regard is incorporated expressly. By means of said locking apparatus 22 on the backrest structure 4, the backrest structure 4 is locked releasably to the associated backrest support 8, more precisely to a corresponding element on the associated backrest support 8, in the present case a striker of the backrest support 8, it being possible for the positions of the locking apparatus 22 and the corresponding element to be swapped. As a result, the backrest 10 forms one kinematic unit in the use position. By means of the fittings 7, a plurality of use positions of said kinematic unit can be set, that is to say the backrest 10, in particular the backrest structure 4, has an adjustable inclination. Instead of the combination of joint 18 and locking apparatus 22, a fitting in the manner of the fitting 7 can also be provided.

On one vehicle seat side, in the present case the vehicle seat side with the backrest compensation spring 17, that is to say the inner side of the vehicle seat 1, an unlocking link 26 is articulated with one of its two ends on the arm 20. At its other end, the unlocking link 26 is articulated on the first actuating element 11 by means of a slot/pin guide 28, the unlocking link 26 having the pin and the first actuating element 11 having the slot in the present case. The reverse allocation is also possible.

Furthermore, a stop link 29 is provided on one vehicle seat side, in the present case the vehicle seat side which lies opposite the backrest compensation spring 17, that is to say the outer side of the vehicle seat 1. The elongate stop link 29 is of rigid configuration. At its one end, in the present case the lower end, it has a slot 29a, by means of which it encloses a first pin 3b which is attached to the base structure 3, offset with respect to the fitting 7 and therefore offset with respect to the pivot axis of the backrest supports 8. At its other end, in the present case the upper end, the stop link 29 is articulated on a second pin 20b which is attached to the arm 20 which is provided on this vehicle seat side, that is to say offset with respect to the joint 18 and therefore offset with respect to the pivot axis of the backrest structure 4.

A spring unit 30 is provided on the same vehicle seat side, that is to say the outer side of the vehicle seat 1, which spring unit 30 is preferably prestressed in the use position. In the present case, the backrest compensation spring 17 and the unlocking link 26 firstly and the stop link 29 and the spring unit 30 secondly are provided in each case on precisely one vehicle seat side, but can also be provided on both vehicle seat sides.

The spring unit 30 is preferably configured as a leaf spring 30 which is attached rotatably (in each case with its end section) firstly to the first pin 3b and secondly to the second pin 20b. However, the spring unit 30 which is configured as a leaf spring can also be attached in some other way offset with respect to the pivot axes of the backrest supports 8 and the backrest structure 4. The spring unit 30 which is configured as a leaf spring is relieved in its stretched position and builds up stress when it is bent, with the result that it can then act as a compression spring.

In one modification (FIG. 11) to the exemplary embodiment, the spring unit 30 is configured as a rubber buffer which acts, for example, between the first pin 3b and the stop link 29, preferably by filling the space between the first pin 3b and the two ends of the slot 29a of the stop link 29 in the slot 29a. This spring unit 30 also acts as a compression spring when the stop link 29 is displaced relative to the first pin 3b, that is to say, in particular, when that end of the slot 29a which is situated further to the outside moves away from the first pin 3b and that end of the slot 29a which lies further to the inside approaches the first pin 3b.

In each case one rocker 33 is articulated with one end on both vehicle seat sides. The other end of each rocker 33 is articulated on a seat cushion structure 35 which is upholstered in a manner known per se. The joints which correspond to one another on the two vehicle seat sides are aligned with one another. Instead of by means of the rockers 33 and their respective two pivot axes, the seat cushion structure 35 can be articulated directly on the base structure 3 in a modified embodiment, that is to say by means of a single pivot axis which is defined by two joints which are aligned with one another. Together with its upholstery, the seat cushion structure 35 defines the seat cushion of the vehicle seat 1. Springs can be active between the base structure 3 and the rockers 33 and/or between the rockers 33 and the seat cushion structure 35 and can build up a prestress. In the use position, the bottom side of the seat cushion structure points substantially downward, slightly obliquely with respect to the vertical. In the use position of the vehicle seat 1, the seat cushion structure 35 and the backrest structure 4 (or the backrest supports 8 or the base structure 3) are locked to one another, for example, or interact in a positively locking manner by means of stops or the like.

The vehicle seat 1 can be transferred from the use position into a flat floor or non-use position. To this end, the locking apparatuses 22 are unlocked, the locking means to the seat cushion structure 35 is optionally also opened, and the backrest structure 4 is pivoted forward about the joints 18 relative to the backrest supports 8. The prestressed spring unit 30 (as a compression spring which is being relieved) provides an assisting action for this movement of the backrest structure 4. The slot/pin guide 28 moves through its idle travel. When the seat cushion structure 35 is unlocked or is released by the backrest structure 4 in an approximately vertical intermediate position of said backrest structure 4, the seat cushion structure 35 pivots forward, in the present case by somewhat more than 180°, with the result that the original bottom side of the seat cushion structure 35 is oriented horizontally and points upward. This movement is assisted in the present case by said prestress which is built up on the rockers 33 by the springs, that is to say takes place automatically.

In a special intermediate position of the backrest structure 4, that is to say at a certain pivoting angle or at least in a region around said certain pivoting angle of the backrest structure 4, the idle travel of the slot/pin guide 28 has been moved through completely. The unlocking link 26 then drives the first actuating element 11, as a result of which the fittings 7 are unlocked in a positively controlled manner (FIG. 8). After both fittings 7 are unlocked and the backrest structure 4 (and the backrest supports 8) reach a certain pivoting angle region, the stop link 29 which is subjected to a tensile load comes into contact with the first pin 3b, that is to say with that end of the slot 29a which lies further to the outside in contact with the first pin 3b (FIG. 2). The spring unit 30 almost assumes its relieved position, that is to say its stretched position in the case of a configuration as a leaf spring and the non-deformed state in the case of a configuration as a rubber buffer. In order to avoid the relieved position being overshot as a result of unfavorable tolerance zones, the spring unit 30 is preferably designed in such a way that it has not yet completely reached its relieved position when the stop link 29 comes into contact with the first pin 3b. On account of the unlocked fittings 7, the backrest supports 8 can be pivoted rearward into the horizontal, and at the same time the backrest structure 4 can continue its pivoting movement in the direction of the horizontal. In principle, this kinematic system would have several degrees of freedom.

However, a four-bar linkage V is defined by the pins 3b and 20b of the stop link 29 which is subjected to a tensile load and is in contact with its stop and by the joint 18 and the fitting 7 on this vehicle seat side as joints, or, viewed in another way, by the stop link 29, the arm 20, the backrest support 8 and the offset between the fitting 7 and the adjacent first pin 3b as mechanism elements. The four-bar linkage V exists temporarily, that is to say during the transition from the use position into the non-use position over the certain pivoting angle region, that is to say as long as the backrest structure 4 is situated in said certain pivoting angle region. The temporary four-bar linkage V controls the kinematic system of the backrest 10, which kinematic system comprises unlocked backrest supports 8 and unlocked backrest structure 4. The four-bar linkage kinematic control which is formed in this way reduces the degrees of freedom of movement to a single degree, that is to say the movements of the backrest structure and the backrest supports 8 are coupled. The stop link 29 acts as a tensile link. The backrest 10 can be moved downward toward the bottom as a result of the backrest top edge 10a (provided on the backrest structure 4) being pushed forward. No contact with the vehicle structure S takes place here. The backrest compensation spring 17 prevents uncontrolled collapse as a result of weight. The backrest compensation spring 17 is never situated in its end stop.

In the end phase of the transition into the non-use position, that is to say when the backrest structure 4 (and the backrest supports 8) leaves the certain pivoting angle region, the stop link 29 leaves the first pin 3b and stresses the spring unit 30 again, that is to say the temporary four-bar linkage V is canceled again, and the kinematic system functions as an uncontrolled (or controlled in another way) two-bar linkage. Both springs, that is to say the backrest compensation spring 17 and the spring unit 30 (which acts as a compression spring which is being stressed), counteract the weight. As a result of the position of the centroid of the backrest structure 4 in front of the joints 18, the backrest structure 4 tips forward onto its front support 3a which is formed, for example, on the base structure 3. By pressing on the rear side of the backrest structure 4, which rear side now lies at the top, the backrest bottom edge 10b (provided on the backrest structure 4) can be deposited on the rear support Sb which is formed, for example, on the vehicle structure S. The non-use position is reached.

The seat cushion structure 35, backrest supports 8 and backrest structure 4 have passed at least approximately into the horizontal. The original bottom side of the seat cushion structure 35 terminates more or less flushly and flatly with the original rear side of the backrest structure 4 which lies behind it. The non-use position can be secured by way of the inherent weight if this is greater than the force of the backrest compensation spring 17 and the spring unit 30, or by way of a locking means, for example by means of the fittings 7 and/or locking apparatuses 22 on corresponding mating elements.

In the present exemplary embodiment, the connecting line of the pins 3b and 20b in the preferred use position is inclined rearward by 23° relative to the vertical, pivots by 5° until the formation of the temporary four-bar linkage V, by 51° during the existence of the temporary four-bar linkage V, and again by a further 18° after canceling of the temporary four-bar linkage V.

For the return, that is to say the transition from the non-use position into the use position, the backrest top edge 10a is pulled rearward, optionally after unlocking. The backrest bottom edge 10b slides along a guide track B which is formed on the vehicle structure S between the rear support Sb and the fastening of the base structure 3 to the vehicle structure S, as a result of which the backrest structure 4 moves upward. The backrest compensation spring 17 assists the upward movement. The stop link 29 is not yet in contact with the first pin 3b, with the result that no temporary four-bar linkage V is defined, but rather the spring unit 30 which is still stressed likewise assists the upward movement. The backrest structure 4 and backrest supports 8 move as a free two-bar linkage kinematic system into the last phase of lifting. The two springs, that is to say the backrest compensation spring 17 and spring unit 30, are arranged geometrically in such a way that their uprighting force is now considerably greater than the weight. First of all the fittings 7 lock again, and then the locking apparatuses 22. The use position is reached again.

If, during the upward movement of the backrest structure 4, the user could hold said backrest structure 4 in contact with the guide track B counter to the force of the two springs 17 and 30, there would be the danger that the deflection of the spring unit 30, in particular in the case of the configuration as a leaf spring, could reach the region of plastic deformation. In order to avoid this case of misuse, the stop link 29 comes into contact by way of that end of the slot 29a which lies further to the inside with the first pin 3b before it occurs, acts as a pushing link, and limits the deflection of the spring unit 30. A temporary four-bar linkage is produced here again which controls the further upward movement of the backrest structure 4 until, in the end phase of the movement, said end of the slot 29a again leaves the first pin 3b and the fittings 7 and the locking apparatuses 22 can lock again.

During a change into another use position, that is to say an inclination setting of the backrest, the kinematic system of the backrest 10 is a single-bar linkage after unlocking of the fittings 7. Its movement toward the front is assisted by the two springs 17 and 30, that is to say the spring unit 30 likewise compensates for part of the weight of the backrest 10.

LIST OF DESIGNATIONS

1 Vehicle seat
3 Base structure
3a Front support
3b First pin
4 Backrest structure
7 Fitting
8 Backrest support
10 Backrest
10a Backrest top edge
10b Backrest bottom edge
11 First actuating element 13 Shaft
15 Second actuating element
17 Backrest compensation spring
18 Joint
20 Arm
20b Second pin
22 Locking apparatus
26 Unlocking link
28 Slot/pin guide
29 Stop link
29a Slot
30 Spring unit
33 Rocker
35 Seat cushion structure
B Guide track
S Vehicle structure
Sb Rear support
V Temporary four-bar linkage

The invention claimed is:

1. A vehicle seat, comprising:
a base structure, which is configured to be connected to a vehicle structure and a first pin supported directly on the base structure;
at least one backrest support, which is articulated in a lockable manner on the base structure by at least one fitting, the first pin being offset in parallel with respect to a rotational axis of the fitting;
a backrest structure, which is articulated on the backrest support by a joint and can be locked to the backrest support by a locking apparatus and on which a second pin is arranged which is offset in parallel with respect to the joint;
a backrest, which has the backrest supports and backrest structure and can be moved relative to the base structure by a kinematic system,
wherein, in order to transfer the vehicle seat from at least one use position, in which the vehicle seat can be sat on, into a non-use position or into a further use position and back again, a four-bar linkage exists temporarily and controls the kinematic system; and
a rigid stop link having a slot that extends lengthwise along a length of the stop link, wherein an end of the slot; comes into contact temporarily with one of the first and second pins in order to form a mechanism element of the temporary four-bar linkage, wherein the rigid stop link is articulated on the other of the two pins,
wherein the first pin is spaced apart from the fitting and an actuating element of the fitting.

2. The vehicle seat as claimed in claim 1, wherein the slot encloses one of the first and second pins.

3. The vehicle seat as claimed in claim 1, wherein the first and second pins, the joint, and the fitting define the temporary four-bar linkage, which controls the kinematic system as long as the backrest structure is situated in a certain pivoting angle region.

4. The vehicle seat as claimed in claim 1, wherein the stop link acts as a tensile link when the temporary four-bar linkage is in existence.

5. The vehicle seat as claimed in claim 1, wherein, in order to avoid a case of misuse, the stop link acts as a pushing link when the vehicle seat returns from the non-use position into the at least one use position, in which the vehicle seat can be sat on.

6. The vehicle seat as claimed in claim 1, further comprising a spring unit is arranged next to the stop link, wherein the spring unit is configured as a leaf spring and acts as a compression spring, wherein the stop link and the spring unit each extend between the first pin and the second pin.

7. The vehicle seat as claimed in claim 6, wherein the spring unit, which is configured as a leaf spring, is attached to the two pins, or wherein the spring unit, which is configured as a leaf spring, is situated close to its stretched position when the temporary four-bar linkage is in existence.

8. The vehicle seat as claimed in claim 1, wherein, in an end phase of the transition into the non-use position, the temporary four-bar linkage is canceled again and the kinematic system functions as an uncontrolled two-bar linkage, wherein the stop link is not in contact with the one of the first and second pins in the end phase.

9. The vehicle seat as claimed in claim 1, wherein, during the transition from the use position into the non-use position, first of all only the locking apparatus unlocks and the backrest structure pivots, which unlocks the fitting in a positively controlled manner in an intermediate position in a certain pivoting angle region.

10. The vehicle seat as claimed in claim 1, wherein, in the use position, the inclination of the backrest structure, which is locked to the backrest support, can be set by the fitting.

11. The vehicle seat as claimed in claim 1, wherein movement of the backrest structure and movement of the backrest support are coupled when the temporary four-bar linkage is in existence.

12. The vehicle seat as claimed in claim 1, further comprising a spring unit attached to and extending between the first pin and the second pin, wherein the spring unit is relatively stressed in the use position and relatively relieved when the temporary four-bar linkage is in existence.

13. The vehicle seat as claimed in claim 12, wherein the slot encloses one of the first pin and the second pin, and wherein one of the first pin and the second pin is not engaged with an end of the slot in the use position and the one of the first pin and the second pin is engaged with the end of the slot when the four-bar linkage is in existence.

14. The vehicle seat as claimed in claim 1, further comprising an unlocking element configured to unlock the fitting.

15. The vehicle seat as claimed in claim 14, wherein a first end of the unlocking element is articulated on the actuating element of the fitting.

16. The vehicle seat as claimed in claim 14, wherein a second end of the unlocking element rotates with the backrest support.

17. The vehicle seat as claimed in claim 14, wherein the unlocking element extends between an arm on the backrest support and the actuating element of the fitting.

* * * * *